(12) United States Patent
Davies et al.

(10) Patent No.: US 12,422,025 B2
(45) Date of Patent: Sep. 23, 2025

(54) DUAL MOTOR DRIVE SYSTEM FOR ACTUATOR

(71) Applicant: Goodrich Actuation Systems Limited, Solihull (GB)

(72) Inventors: Stephen Harlow Davies, Shrewsbury (GB); David John Holman, Wolverhampton (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 18/315,167

(22) Filed: May 10, 2023

(65) Prior Publication Data
US 2023/0366454 A1  Nov. 16, 2023

(30) Foreign Application Priority Data

May 13, 2022 (EP) .................................. 22275064

(51) Int. Cl.
*F16H 19/02* (2006.01)
*B64C 13/38* (2006.01)
(Continued)

(52) U.S. Cl.
CPC ............. *F16H 19/02* (2013.01); *B64C 13/38* (2013.01); *B64C 13/505* (2018.01); *F16D 13/24* (2013.01);
(Continued)

(58) Field of Classification Search
CPC ....... B64C 13/505; F16D 13/24; F16D 13/26; F16D 41/16; F16D 41/064; F16H 19/02; F16H 3/10; F16H 37/065; F16H 41/16
See application file for complete search history.

(56) References Cited

U.S. PATENT DOCUMENTS 8,230,750 B2   7/2012  Flatt et al.
10,086,933 B2  10/2018 Roberts et al.
(Continued)

FOREIGN PATENT DOCUMENTS

CN      1980010 B    6/2012
CN    110701249 A    1/2020
(Continued)

OTHER PUBLICATIONS

CN110701249 Translation (Year: 2020).*
(Continued)

*Primary Examiner* — Minnah L Seoh
*Assistant Examiner* — Gregory T Prather
(74) *Attorney, Agent, or Firm* — CANTOR COLBURN LLP

(57) ABSTRACT

A drive system for an actuator comprises first and second motors, and first and second input shafts connected to be driven by the respective first and second motors. Each of the first and second input shafts comprises a first overrunning clutch configured to rotate with the input shaft in a first direction, and a second overrunning clutch configured to rotate with the input shaft in a second direction. A first drive gear is configured to be driven by either one of the first overrunning clutches, and a second drive gear is configured to be driven by either one of the second overrunning clutches, and an output clutch and an output shaft are arranged to be driven by the first drive gear in a first mode of operation of the drive system and be driven by the second drive gear in a second mode of operation of the drive system.

10 Claims, 14 Drawing Sheets

(51) Int. Cl.
*B64C 13/50* (2006.01)
*F16D 13/24* (2006.01)
*F16D 41/16* (2006.01)
*F16H 3/10* (2006.01)
*F16H 37/06* (2006.01)

(52) U.S. Cl.
CPC ............... *F16D 41/16* (2013.01); *F16H 3/10* (2013.01); *F16H 37/065* (2013.01)

(56) References Cited

U.S. PATENT DOCUMENTS

| | | | | |
|---|---|---|---|---|
| 11,136,010 | B2* | 10/2021 | Suzuki | F16D 65/18 |
| 2005/0103928 | A1* | 5/2005 | Flatt | H02K 7/116 |
| | | | | 244/10 |
| 2008/0271554 | A1* | 11/2008 | Mohr | F16D 13/26 |
| | | | | 74/318 |
| 2009/0222178 | A1 | 9/2009 | Valle | |
| 2012/0241276 | A1* | 9/2012 | Braford, Jr. | F16D 47/04 |
| | | | | 192/41 R |
| 2020/0361622 | A1 | 11/2020 | Groninga et al. | |

FOREIGN PATENT DOCUMENTS

| | | |
|---|---|---|
| CN | 114228979 A | 3/2022 |
| EP | 0947658 B1 | 5/2005 |
| EP | 2602184 A1 | 6/2013 |

OTHER PUBLICATIONS

Abstract for CN114228979 (A), Published: Mar. 25, 2022, 1 page.
Abstract for CN1980010 (B), Published: Jun. 13, 2012, 1 page.
Abstract for EP0947658 (B1), Published: May 4, 2005, 1 page.
Abstract of CN110701249 (A), Published: Jan. 17, 2020, 1 page.
Abstract of EP2602184 (A1), Published: Jun. 12, 2013, 1 page.
European Search Report for Application No. 22275064.8, mailed Aug. 11, 2022, 7 pages.

* cited by examiner

DUAL MOTOR DRIVE SYSTEM FOR ACTUATOR

CROSS-REFERENCE TO RELATED APPLICATIONS

This application claims priority to European Patent Application No. 22275064.8 filed May 13, 2022, the entire contents of which is incorporated herein by reference.

TECHNICAL FIELD

The present invention relates to an electromechanical drive system with dual electric motor drive, in particular for use as or as part of an electrically driven actuator or actuation system on an aircraft.

BACKGROUND

Actuators are used in various parts of aircraft systems to move mechanical elements of the aircraft, for example control surfaces, between two positions. This actuation is often driven, directly or indirectly, by motors.

Actuators and actuation systems in aircraft are often considered safety critical, such that secondary or redundant drive channels must be provided in case of failure of a primary drive channel. There is also a need for both primary and secondary systems to be robust.

In aircraft systems, there is a further need for any actuator and associated drive systems to be compact for packaging reasons, and to be low-weight. It is also desirable for actuators and drive systems to have as little complexity as possible, which can reduce the chance of failure and reduce maintenance requirements.

SUMMARY

In the present disclosure, there is provided a dual motor electric drive system which provides redundancy against motor drive channel failures and facilitates dual channel electric motor drives in either active-active (both motors driving) or active-standby (one motor driving) modes, while also being robust, efficiently packaged, and having a reduced complexity compared to other arrangements.

According to a first aspect of the present disclosure, there is provided a drive system for an actuator or actuation system, the drive system comprising first and second motors, and first and second input shafts connected to be driven by the respective first and second motors. Each of the first and second input shafts comprise a first overrunning clutch configured to rotate with the input shaft in a first direction, and a second overrunning clutch configured to rotate with the input shaft in a second direction. The drive system further comprises a first drive gear configured to be driven by either one of the first overrunning clutches, and a second drive gear configured to be driven by either one of the second overrunning clutches. The drive system further comprises an output shaft and an output clutch associated with the output shaft, wherein the output clutch and output shaft are arranged to be driven by the first drive gear in a first mode of operation of the drive system and be driven by the second drive gear in a second mode of operation of the drive system.

In an active-active mode, the two motors are active and the drive system combines the input of the motors into a single output, so that an output torque is the sum of the torque provided by each motor.

In an active-standby mode, the drive system delivers the torque provided by one, active motor to the output whilst allowing another, standby motor to remain stationary. In the case that the input of the active motor fails, the drive system connects the input of the standby motor to the output. In the case of such a failure mode, the drive system will drive the output irrespective as to whether the failure of the input is due to a mechanical seizure within the motor or a loss of power delivered to the motor. The drive system is therefore robust against a failure of either motor or associated electric drive channel.

The described functionality of the drive system is provided whether the drive system is commanded to drive in a clockwise or anticlockwise direction of output rotation.

The drive system is a significant improvement over a drive system arrangements that may use a differential gearbox to couple two motor drive channels to a single output. Such a differential arrangement may have a greatly increased complexity, for example requiring additional electrically actuated brakes to earth the differential gearbox, additional electrical interfaces, additional electrical power and additional command signals.

In a further embodiment of the drive system described above, the output shaft defines an axis of rotation, and the output clutch comprises a driven clutch part connected to the output shaft and first and second driving clutch parts which are axially moveable into and out of engagement with the driven clutch part.

In a further embodiment of any of the above, the first and second drive gears are each positioned adjacent to a respective one of the first and second driving clutch parts, each of the first and second drive gears and driving clutch parts comprise a plurality of ramp elements, and a plurality of rolling elements are positioned between the ramp elements of adjacent ones of the first and second drive gears and driving clutch parts.

In a further embodiment of any of the above, the plurality of rolling elements comprise a plurality of ball bearings.

In a further embodiment of any of the above, the drive system further comprises first and second bearing cages, each bearing cage comprising a plurality of openings, the plurality of ball bearings received within the plurality of openings.

In a further embodiment of any of the above, the output clutch comprises a cone clutch comprising a pair of male cone elements and a pair of female cone elements, one of the male cone elements in frictional contact with one of the female cone elements in the first mode of operation, and the other one of the male cone elements in frictional contact with the other one of the female cone elements in the second mode of operation.

In a further embodiment of any of the above, the pair of male cone elements form the driven clutch part, and the pair of female cone elements form the first and second driving clutch parts.

In a further embodiment of any of the above, the first and second input shafts define axes of rotation which are parallel to the axis of the output shaft.

In a further embodiment of any of the above, each of the first overrunning clutches comprises gear teeth formed around an outer periphery, the gear teeth meshing with gear teeth of the first drive gear, and each of the second overrunning clutches comprises gear teeth formed around an outer periphery, the gear teeth meshing with gear teeth of the second drive gear.

In a further embodiment of any of the above, each of the first overrunning clutches and each of the second overrunning clutches comprises a sprag clutch, each having a plurality of sprag elements in contact with the respective input shaft.

In a further embodiment of any of the above, the drive system further comprises a dynamic drag clutch comprising a brake wheel connected to the output shaft and at least one drag pin in contact with the brake wheel.

In a further embodiment of any of the above, the drive system further comprises an epicyclic gearbox, the output shaft arranged to drive an input of the epicyclic gearbox.

In a further embodiment of any of the above, the first and second motors comprise the same maximum speed and torque capability and/or the same relationship of speed to torque.

According to a further aspect of the present disclosure, there is provided an actuator assembly for a control surface of an aircraft, the actuator assembly comprising an actuator and a drive system according to any of the above embodiments, the drive system connected to drive the actuator.

In a further embodiment of the above, the actuator is a linear actuator.

These and other features of the disclosure can be best understood from the following description and drawings.

DETAILED DESCRIPTION OF THE DRAWINGS

Figure 1:
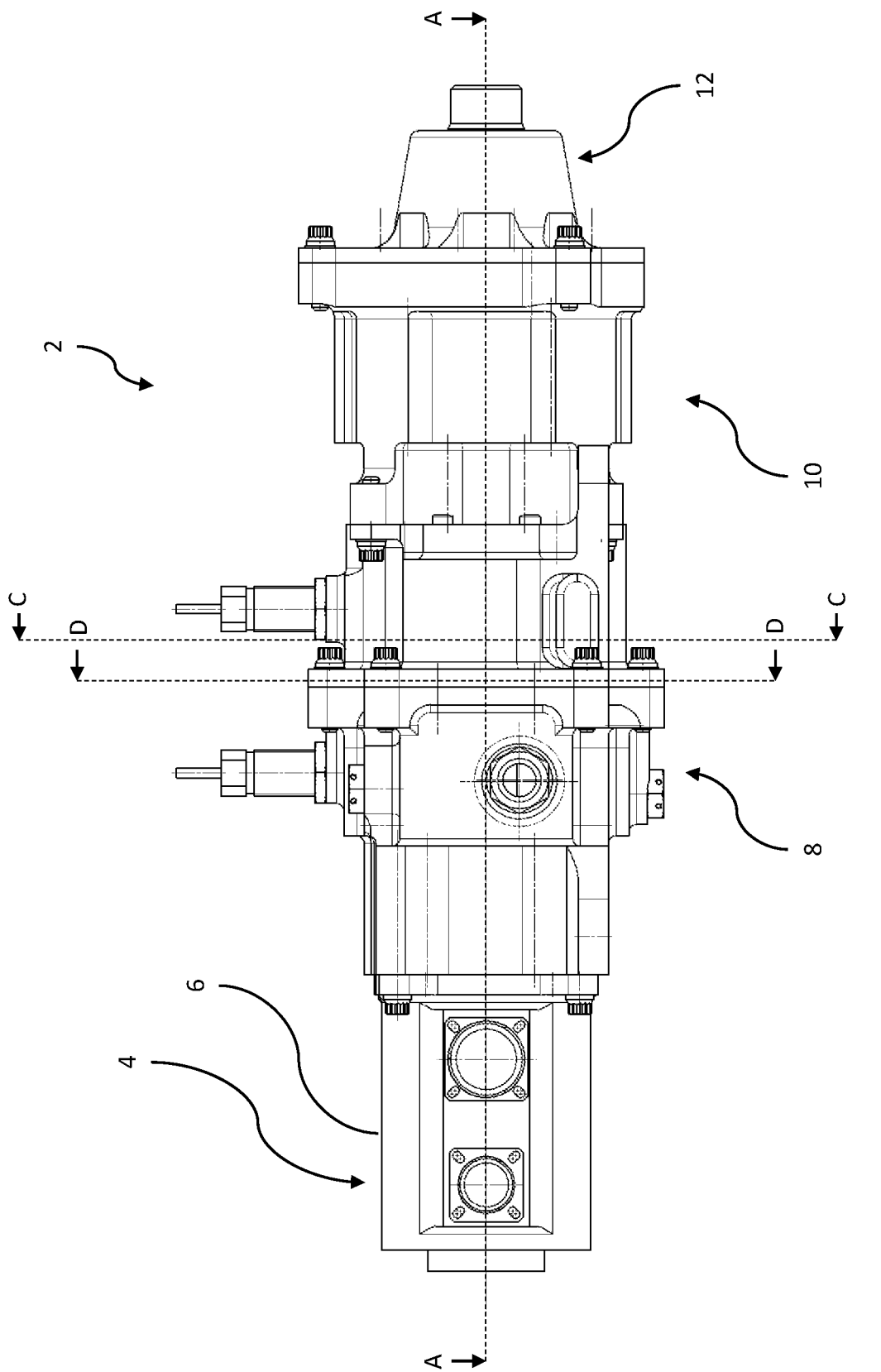
FIG. 1 shows a side view of a drive system according to an aspect of the disclosure.
Figure 2:
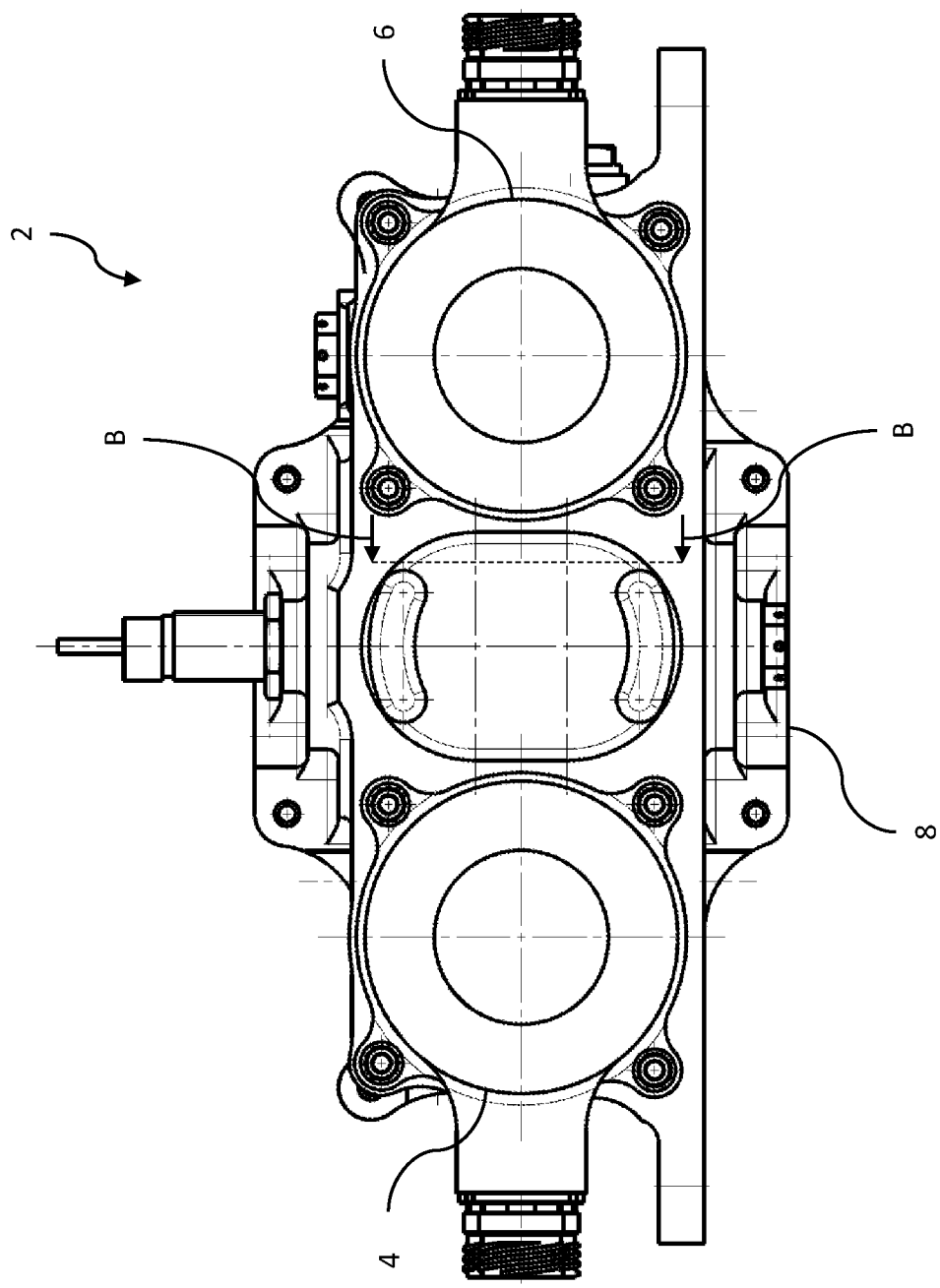
FIG. 2 shows a front view of the drive system of FIG. 1.

FIGS. 1 and 2 show side and front views of an electromechanical actuator drive system comprising two motors linked to a single, common, drive output. The drive system 2 comprises first and second electric motors 4, 6 connected to respective inputs of a first, combined input gearbox 8. The combined input gearbox combines the torque input of the motors to provide a single output. The system further includes a second gearbox 10 connected to the output of the combined input gearbox 8, which provides the drive system output 12.

The drive system 2 is configured such that either of the first or second motors 4, 6 can drive the drive system output 12 in either rotational direction, depending on the mode of operation of the drive system 2, to provide driving actuation in two directions. In addition, the same drive system 2 can be operated such that the first and second motors 4, 6 both drive the drive system output 12 together to provide a combined torque in either rotational direction.

Figure 3:
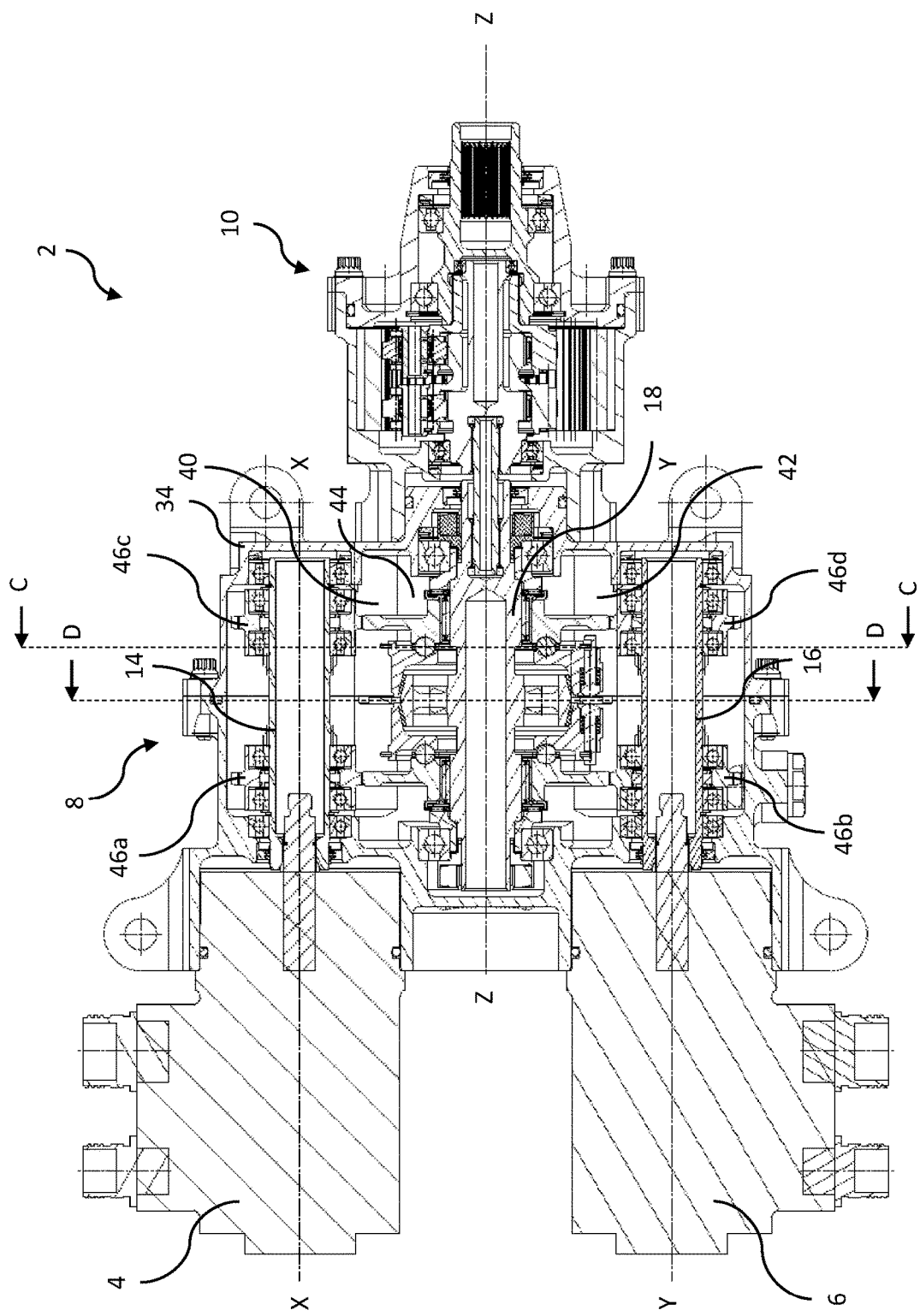
FIG. 3 shows a section plan view of the drive system of FIGS. 1 and 2 along the line A.

FIG. 3 is a section plan view of the drive system 2 along line A of FIGS. 1 and 2, showing internal features of the first and second gearboxes 8, 10. The first and second motors 4, 6 drive respective first and second input shafts 14, 16 positioned in the first gearbox 8. The first and second input shafts 14, 16 rotate about axes X and Y. The first and second input shafts 14, 16 in turn drive an output shaft 18 18 of the first gearbox 8 about a rotational axis Z. The output shaft 18 is connected to the second gearbox 10, which in turn drives the drive system output 12.

Figure 4:
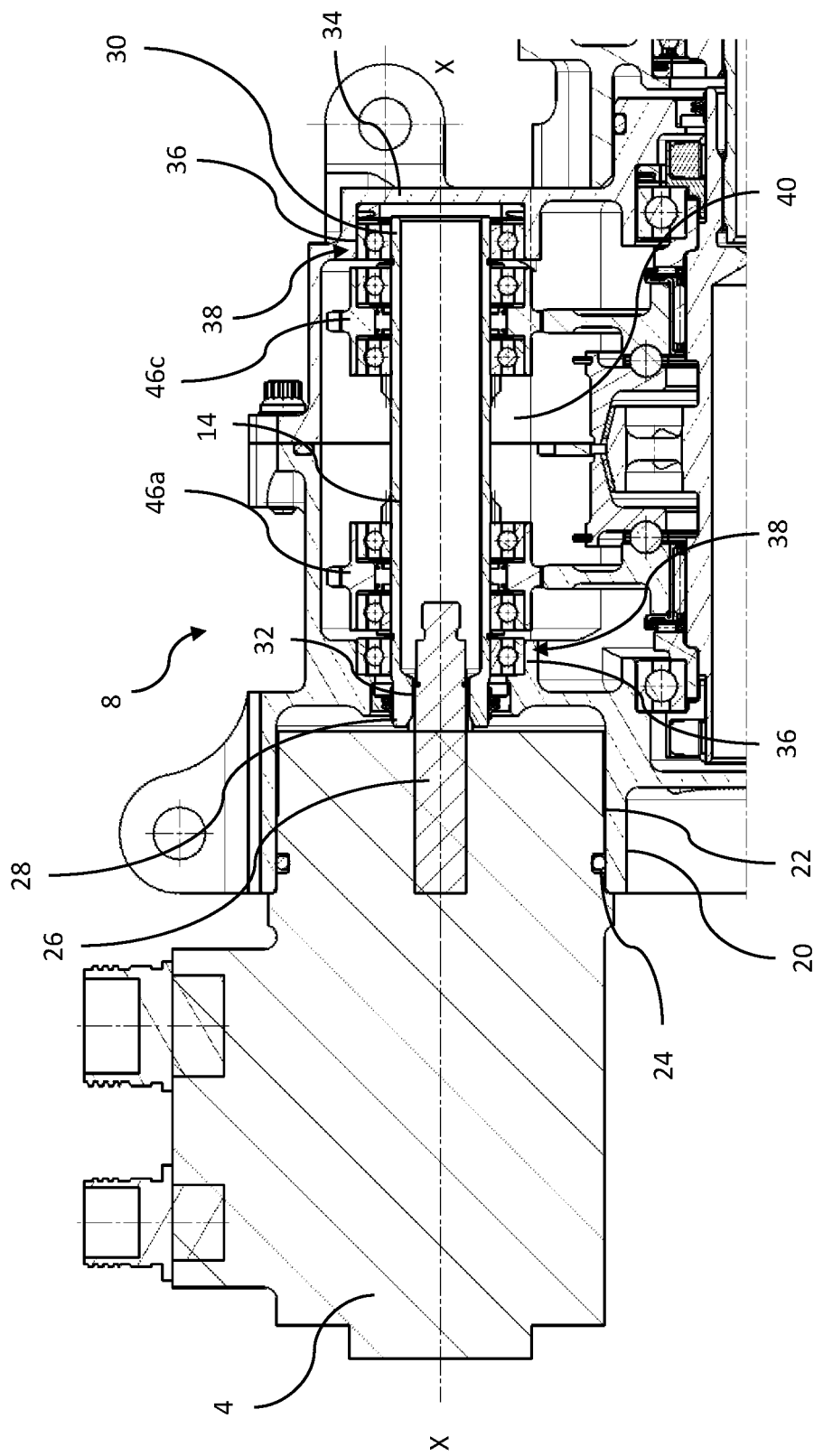
FIG. 4 shows a partial, detail view of one part of the drive system of FIG. 3.

FIG. 4 is a partial section view of the drive system 2 of FIG. 3 which shows in more detail the first motor 4 and the first input shaft 14 of the first gearbox 8. The first gearbox 8 comprises a receiving socket 20 in which the first motor 4 is received. The receiving socket 20 is defined by a socket wall extending in the direction of the axis X. The receiving socket 20 is correspondingly shaped to an outer periphery 22 of the motor 4, and the motor 4 is disposed in the receiving socket 20 in a press-fit. The motor comprises a seal 24 positioned in a circumferential slot at the outer periphery 22, which sealingly contacts the outer periphery 24 and the socket wall. The outer periphery 22 of the motor 4 is generally cylindrical, and the socket wall and the seal 24 are correspondingly annular.

The first motor 4 comprises a motor drive shaft 26 which is connected to the first input shaft 14 of the first gearbox 8. The first input shaft 14 comprises a tubular shape formed by an annular wall around the rotational axis X of the input shaft 14. The input shaft 14 extends axially from a first, connecting end 28 adjacent the motor to a distal, second end 30. The connecting end 28 of the input shaft 14 comprises an opening 32 circumscribed by a radially constricted portion of the annular wall. The radially constricted portion is correspondingly shaped to the motor drive shaft 26, which is received in the opening 32.

The motor drive shaft 26 is connected to the input shaft 14 such that the motor drive shaft 26 can drive the first input shaft 14 in either rotational direction. The motor drive shaft 26 and opening 32 may comprise a splined, or keyed fit to provide the connection and driving engagement between the motor drive shaft 26 and the input shaft 14.

The first gearbox 8 comprises a wall 34 defining an interior space including a first cavity 40, the first input shaft 14 received in the first cavity 40. The gearbox wall 34 comprises shoulders 36 at an inner periphery thereof for receiving the input shaft 14. The input shaft 14 comprises bearings 38 to allow rotation of the input shaft 14 in-place in the cavity 40. The bearings 38 comprise roller elements between races, the races cooperating with the wall of the input shaft 14 and with the shoulders 36 of the first gearbox 8. The input shaft 14 comprises two pluralities of thrust bearings, respectively positioned at each of the first and second ends 28, 30 of the input shaft 14, to support the input shaft 14 across its length.

Returning to FIG. 3, the second motor 6 is connected to the second input shaft 16 of the first gearbox 8 in the same manner as the first motor 4 and first input shaft 14, and the second input shaft 16 is similarly positioned in a second cavity 42 of the first gearbox 8. The second motor 6 and second input shaft 16 comprise all of the same features described above in relation to the first motor 4 and first input shaft 14. In the illustrated example, the two sets of features are substantially identical. In particular, the first and second motors 4, 6 in the example shown comprise the same type of motor, with the same dimensions and drive characteristics, such that the two motors 4, 6 can each independently provide the entire drive required of the system 2. The drive characteristic of each motor may be defined as the maximum speed and torque capability of the motor and/or the relationship of speed to torque output by the motor.

In other alternatives, the second motor 6 may be smaller and/or have a different drive characteristic than the first motor 4, which may reduce space and weight of the overall assembly while still allowing the second motor 6 to act as a backup or auxiliary to the first motor 4.

The output shaft 18 is received in a third cavity 44 in the first gearbox 8. The output shaft 18 is centrally located in the first gearbox 8, with the two inputs shafts 14, 16 disposed on laterally opposite sides of the output shaft 18. The first and second cavities 40, 42 receiving the input shafts 14, 16 are disposed on opposed lateral sides of the third cavity 44. The first, second and third cavities 40, 42, 44 are linked together to form a single interior space, circumscribed by the wall 34 of the first gearbox 8. The wall 34 defines a substantially fluid-tight space, to best retain any lubricant within the drive system 2. The first, second and third cavities 40, 42, 44 are fluidly linked, allowing lubricant to flow within substantially the whole interior space. The interiors of the first and second gearboxes 8, 10 may also be fluidly linked, so that lubricant is shared between the interiors and so that unnecessary seals may be avoided.

The first and second input shafts 14, 16 are each drivingly connected to the output shaft 18 via a plurality of overrunning clutches 46a-d positioned on each of the input shafts 14, 16. The overrunning clutches 46a-d are each configured to turn with the respective one of the input shafts 14, 16 when the shaft rotates in one rotational direction (a driving direction), and to allow free-running of the input shaft 14, 16 in another rotational direction (an overrunning direction). The overrunning clutches 46a-d thereby transfer torque from the input shaft to the output shaft 18 only in one of the two rotational directions.

Figure 5:
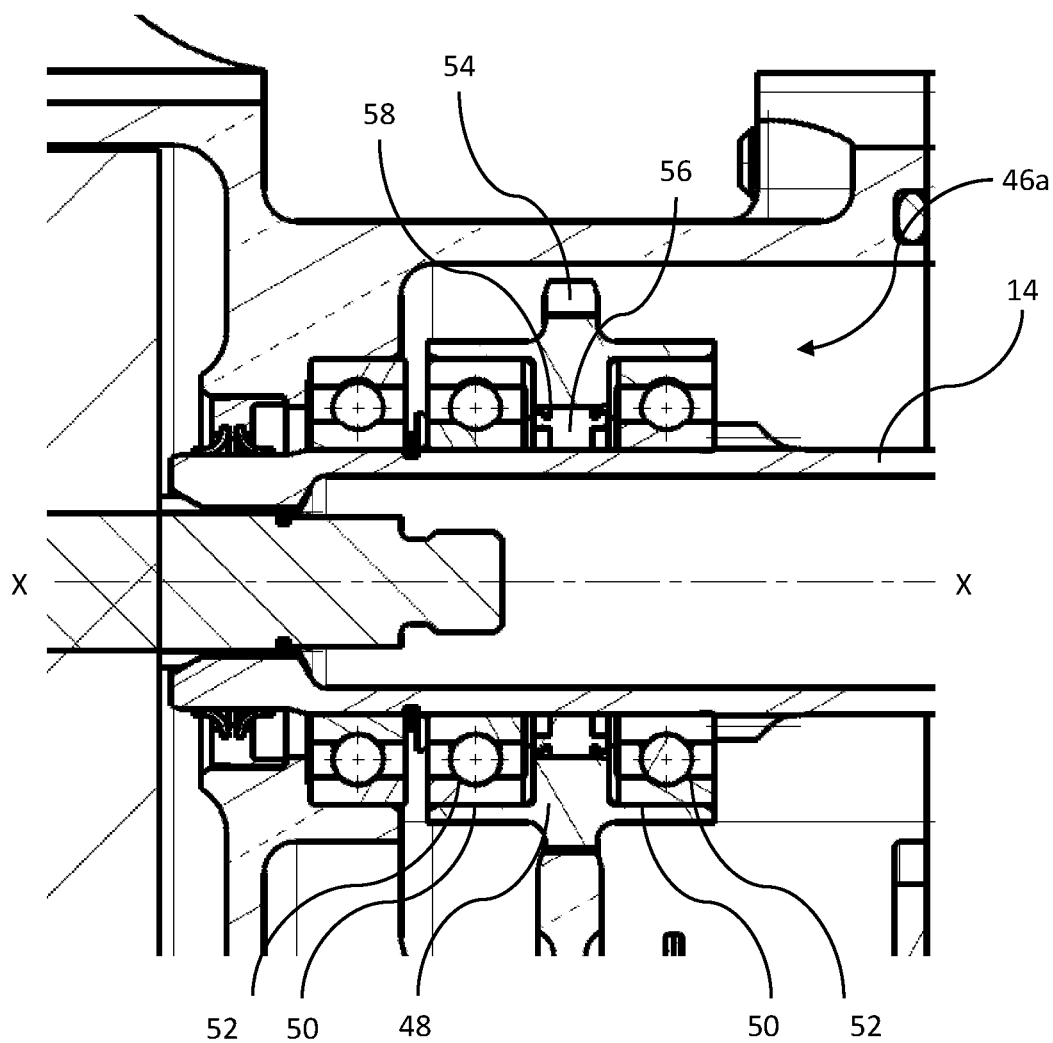
FIG. 5 shows a partial, detail view of one part of the drive system of FIG. 4.

FIG. 5 is a partial, detail view showing a first overrunning clutch 46a of the first input shaft 14 in more detail. The overrunning clutch 46a comprises an annular body 48 encircling and coaxial with the first input shaft 14. The annular body comprises shoulders 50 extending axially outward therefrom in each direction. The shoulders define bearing recesses on either axial side of the overrunning clutch 46a, in which thrust bearings 52 are received. Races of the bearing cooperate with the shoulders 50 and with a surface of the first input shaft 14, supporting the annular body 48 at either axial side while allowing free rotation of the overrunning clutch 46a around the input shaft 14. The overrunning clutch 46a comprises a geared portion 54 with a plurality of gear teeth disposed around an outer circumference of the annular body 48 for meshing with a drive gear of the output shaft 18, as will be described further below.

Each of the first and second input shafts 14, 16 comprises respective first overrunning clutches 46a, 46b and second overrunning clutches 46c, 46d, which each comprise all of the features described above in relation to the first overrunning clutch 46a on the first input shaft 14. Each of the first overrunning clutches 46a, 46b are axially spaced from the respective second overrunning clutches 46c, 46d along the input shafts 14, 16, with the first overrunning clutches 46a, 46b positioned towards the connecting end 28 of the input shafts 14, 16, and the second overrunning clutches 46c, 46d generally towards the distal end 30. The first overrunning clutches 46a, 46b are configured to engage with or allow free-running of the input shaft 14, 16 in different rotational directions to the second overrunning clutches 46c, 46d. That is, each of the first overrunning clutches 46a, 46b engages with the input shaft 14, 16 in a first rotational direction (for example, a clockwise direction) of the input shaft 14, 16, and free-wheels relative to the input shaft 14, 16 in a second rotational direction (for example, an anti-clockwise direction). Each of the second overrunning clutches 46c, 46d engages with the input shaft 14, 16 in the second rotational direction, and free-wheels relative to the input shaft 14, 16 in the first rotational direction. The first and second overrunning clutches 46b, 46d of the second input shaft 16 are aligned in an axial direction with the first and second overrunning clutches 46a, 46c of the first input shaft 14, with the aligned one of the overrunning clutches 46a-d sharing the same rotational driving direction.

In the example shown, the overrunning clutches 46a-d comprise first and second sprag clutches, each comprising a plurality of sprag elements 56. The sprag elements 56 of the first and second sprag clutches 46a-d are positioned within the respective outer race of each of the overrunning clutches. The sprag elements 56 are connected to an inner surface 58 of the annular body 48 such that they are able to flex in-place between a slip position and a drive position. A contact surface of each of the sprag elements 56 contacts the wall of the input shaft 14, 16. When the input shaft 14, 16 rotates in the first rotational direction, the sprag elements 56 of the first sprag clutch 46a, 46b are forced into a drive position, and form a driving engagement between the input shaft 14, 16 and the annular body 48. When the input shaft 14, 16 rotates in the second rotational direction, the sprag elements 56 of the first sprag clutch 46a, 46b are allowed to return to a slip position, and the input shaft 14, 16 rotates freely within a slip contact of the sprag elements 56. The sprag elements 56 in the second sprag clutch 46c, 46d are positioned in a circumferentially mirrored direction to the sprag elements 56 of the first sprag clutch 46a, 46b. In the second sprag clutch 46c, 46d, the sprag elements 56 function in the same manner as those in the first sprag clutch 46a, 46b, except in the opposed rotational directions.

Figure 6:
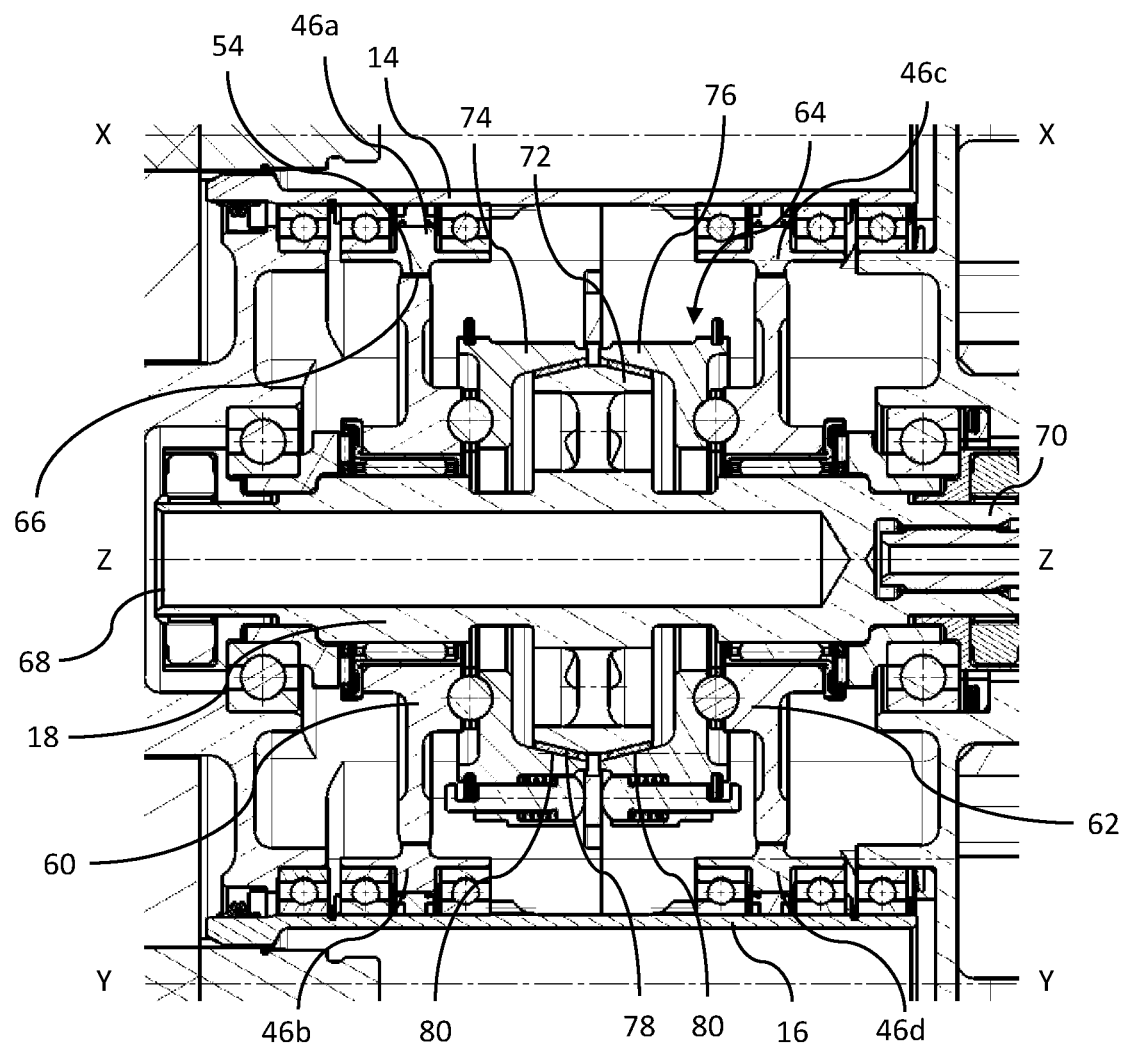
FIG. 6 shows another partial, detail view of another part of the drive system of FIG. 3.

FIG. 6 is a partial section view of the drive system 2 of FIG. 3 showing features of the output shaft 18 in greater detail. The output shaft 18 comprises first and second drive gears 60, 62 which are each configured to receive torque from either of the first and second input shafts 14, 16. The first and second drive gears 60, 62 are each configured to rotate freely around the output shaft 18 in one mode of operation, and to be engaged with the output shaft 18 via an output clutch 64 in another mode of operation, driving the output shaft 18.

The first and second drive gears 60, 62 each comprise an annular body, with gear teeth 66 arranged around a radially outer surface, and a central bore defined by a radially inner surface which is spaced from the output shaft 18. The gear teeth 66 of the first and second drive gears 60, 62 mesh with gear teeth 54 of the overrunning clutches 46a-d of the first and second input shafts 14, 16.

A first drive gear 60 is positioned towards a first axial end 68 of the output shaft 18 closest to the first and second motors 4, 6, aligned and meshed with the first overrunning clutches 46 of both of the first and second input shafts 14, 16. A second drive gear 62 is positioned towards a second axial end 70 of the output shaft 18 closest to an output of the first gearbox 8, aligned and meshed with the second overrunning clutches 46*a-d* of both of the first and second input shafts 14, 16.

The arrangement of overrunning clutches 46*a-d* allows either of the first and second input shafts 14, 16 to drive the output shaft 18 while preventing binding of the drive gears 60, 62. For example, driving the first input shaft 14 in the first direction transmits torque through the first overrunning clutch 46*a* to the first drive gear 60, causing the output shaft 18 to rotate in the opposing second direction. The first drive gear 60 is also meshed with the first overrunning clutch 46*b* of the second input shaft 16, but the first overrunning clutch 46*b* of the second input shaft 16 is allowed to turn freely when the first overrunning clutch 46*a* of the first input shaft 14 is driving. In this manner, movement of the drive gear 60 is not seized despite connection to both of the first overrunning clutches 46*a*, 46*b*. As such, the first motor 4 can drive the output shaft 18 while the second motor 6 is stationary or running under-speed compared to the first motor 4.

A similar function occurs if, vice-versa, the second input shaft 16 is driven by the second motor 6 to rotate more quickly than the first input shaft 14. In this mode, the first overrunning clutch 46*b* on the second input shaft 16 drives the first drive gear 60, and the first overrunning clutch 46*a* on the first input shaft 14 turns freely.

The output shaft 16 can receive driving input from either of the first of second motors 4, 6 via the first and second input shafts 14, 16. This allows, for example, one of the first and second motors 4, 6 to be provided as a primary motor, and another to be retained as a secondary or redundant motor for the event of a failure of the primary motor.

In addition, the arrangement of the system 2 described above is such that the speed of drive system output 12 is the same when driven by either motor. This contrasts, for example, to a differential gearbox arrangement with two motors, where output speed of the gearbox is proportionate to an average of the input speeds, so that running only one motor causes an output to rotate at half of the regular speed.

In another mode of function, if the first and second input shafts 14, 16 are driven at substantially the same speed, both will drive the first drive gear 60 and transfer torque to the output shaft 18. The torque of the output shaft 18 is a combination of the torques of the input shafts 14, 16. Any incidental or intermittent differences in the speed of the first and second motors 4, 6 and the input shafts 14, 16 which might otherwise cause binding or seizure of the drive gear 60 is instead compensated for by the presence of the overrunning clutches 46.

In addition to being drivable in the second rotational direction as described above, the output shaft 18 is drivable in the first rotational direction by either of the first and second inputs shafts 14, 16 via the second drive gear 62 in a similar manner to that described above. Rotating either of the first or second input shafts 14, 16 in the second direction engages the respective second overrunning clutch 46*c*, 46*d*, transferring torque to the second drive gear 62 and rotating the output shaft 18 in the first direction. Again, the first and second motors 4, 6 can be used as primary and secondary motors or can provide a combined torque output.

While the illustrated arrangement and present description relate to an example where two motors are used to drive an output, the same features may be applied to an embodiment of a drive system where the input of any number of motors may be combined to provide a single output. In such examples, additional motors and input shafts around the output shaft may comprise overrunning clutches which mesh with the drive gears in a similar manner to that described in relation to the first and second motors and input shafts. Such an arrangement would function similarly to that described above, with each motor able to drive the output shaft independently or together to provide a combined torque output.

To allow the output shaft 18 to be driven in either direction by either motor, a clutch connection or output clutch 64 is provided between the first and second drive gears 60, 62 and the output shaft 18. The output clutch 64 selectively engages one or other of the drive gears with the output shaft 18, allowing transfer of torque from the first drive gear 60 to the output shaft 18 in a first mode of operation, and from the second drive gear 62 to the output shaft 18 in a second mode of operation.

The output clutch 64 includes a driven clutch part 72, which is fixedly attached to or formed integrally with the output shaft 18, and a pair of driving clutch parts 74, 76, which independently and selectively bind with the driven clutch part 72 in order to transfer torque from the drive gears 60, 62 to the output shaft 18. The driving clutch parts 74, 76 are moveable axially into and out of contact with the driven clutch part 72, to engage or disengage depending on the mode of operation. The output clutch 64 comprises a first driving clutch part 74 associated with the first drive gear 60 and a second driving clutch part 76 associated with the second drive gear 62.

In the arrangement shown, the clutch connection is a cone clutch. The driven clutch part 72 is centrally located on the output shaft 18, and comprises a body with a surface 78 defining two male cone elements facing opposed axial directions. The driving clutch parts 74, 76 each comprise a body with a surface 80 defining female cone elements, facing towards the respective male cone elements and correspondingly shaped to receive the male cone elements. The driving clutch parts 74, 76 are configured to be axially moveable along the output shaft 18, to move into and out of contact with the driven clutch part 72, and selectively bind to the driven clutch part 72 through friction between the surfaces 78, 80 of the clutch parts.

In an alternative cone clutch, which is not illustrated, the driven clutch part may comprise a body with a surface defining two female cone elements, and the driving clutch parts may each comprise a body with a surface defining male cone elements. The function of the driven part and the driving parts is similar to that described above.

The driving clutch parts 74, 76 are positioned around the output shaft 18 and coaxially therewith. The driving clutch parts 74, 76 are configured to rotate freely about the output shaft 18 when not engaged with the driven clutch part 72. The bodies of the driving clutch parts 74, 76 are annular, each comprising a central bore defined by a radially inner surface which is spaced from the output shaft 18.

Figure 7:
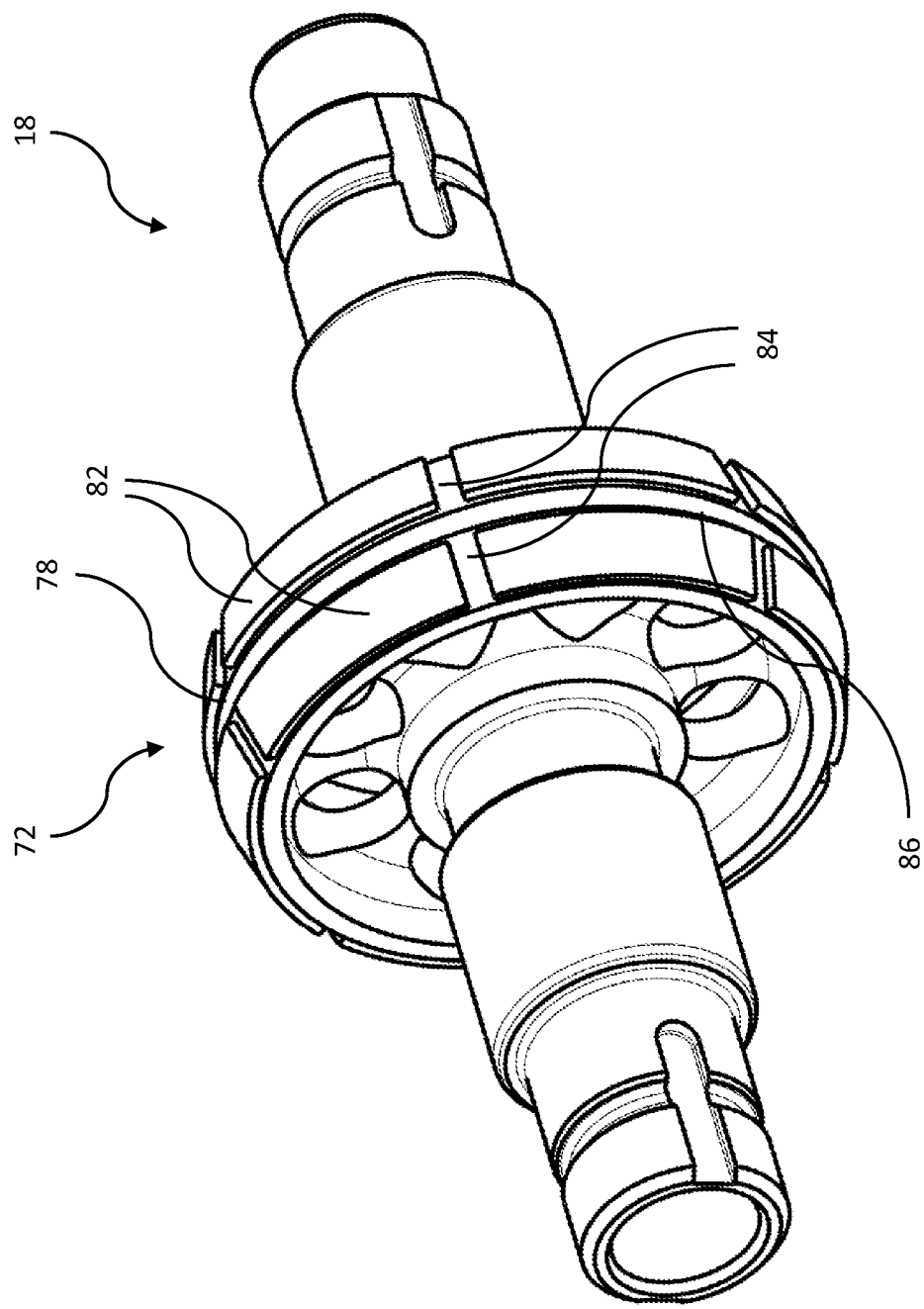
FIG. 7 shows an isolated perspective view of an output shaft 18 of the drive system of FIG. 3.

FIG. 7 shows a view of the output shaft 18 and driven clutch part 72 in isolation. The cone clutch further comprises a plurality of friction elements 82, configured to enhance friction binding between the driving clutch parts 74, 76 and the driven clutch part 72. The plurality of friction elements 82 comprise arc segments positioned around the circumference of the surface 78 of the driven clutch part 72 on each of the male cone elements. A circumferential separation between the arc segments forms axial oil channels 84 for lubricant flow around the friction-binding surfaces. There is also an axial separation between the friction elements of each of the two male cone surfaces, to define a circumferential oil channel 86 therebetween for similar purposes. The plurality of friction elements 82 each comprise a section of material which is attached to the surface 78 of the driven clutch part 72, and interfaces with the surfaces 80 of the driving clutch parts 74, 76 when the cone clutch is engaged. The material in one example is a hard-wearing para-aramid, for example polyparaphenylene terephthalamide.

In an alternative, not illustrated, the plurality of friction elements 82 may instead be attached to the surfaces 80 of the driving clutch parts 74, 76, and interface with surface 78 of the driven clutch part 72 when the cone clutch is engaged.

Figure 8:
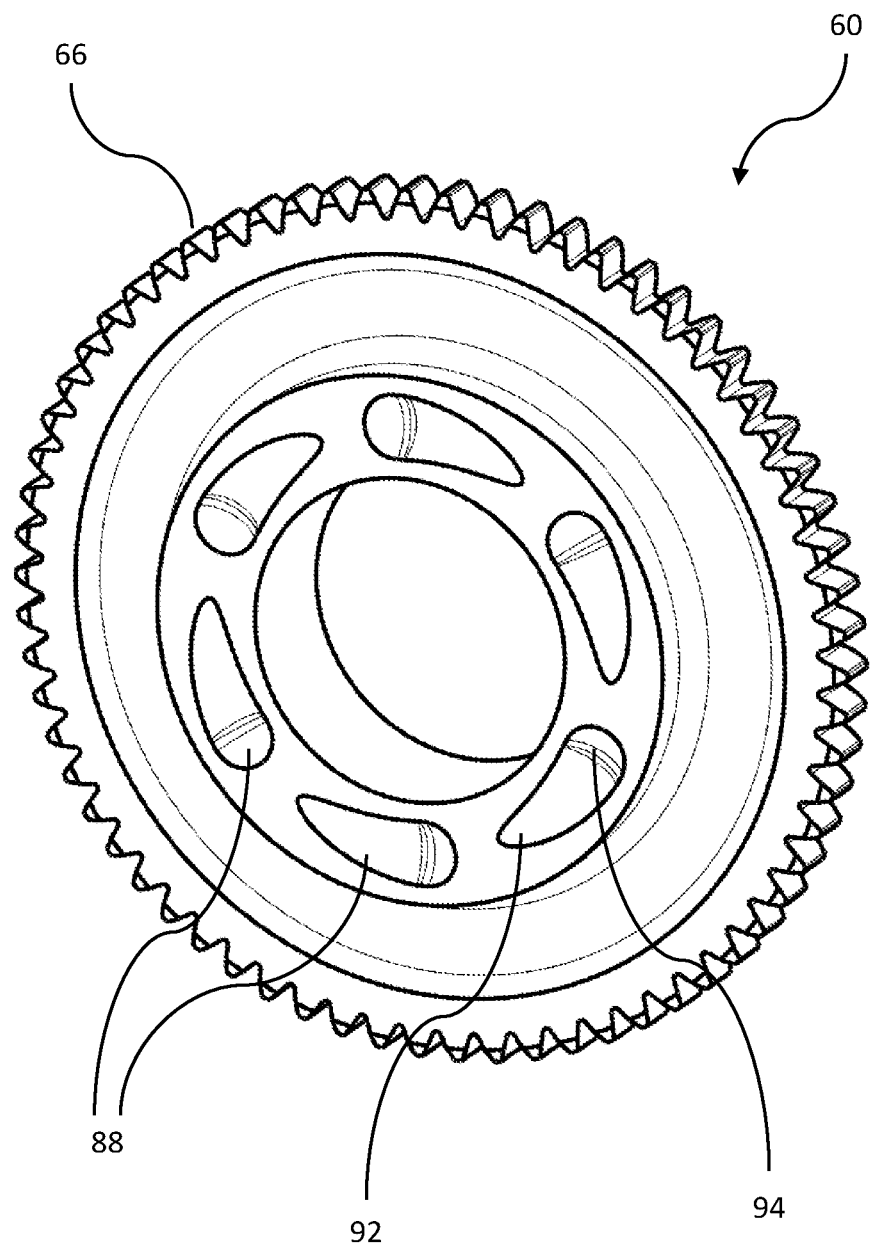
FIG. 8 shows an isolated perspective view of a drive gear of the drive system of FIG. 3.

Selective engagement of either one or both of the driving clutch parts 74, 76 with the central driven clutch part 72 may be controlled through the use of ramp elements for rolling bearings on the driver gears and the driving clutch parts 74, 76. FIG. 8 shows the first driver gear 60 in isolation. The first driver gear 60 comprises a plurality of ramp elements 88 shaped and configured to receive and cooperate with rolling bearings 90. In the illustrated example, the ramp elements are ball ramps, and the rolling bearings are ball bearings.

The ramp elements 88 comprise depressions formed into the annular body of the drive gear 60 to form sloped surfaces. The ramp elements define a gradient in the axial direction, such that they extend circumferentially from an axially deeper end 92 to an axially shallower end 94, and such that they taper in width around the circumferential direction between the two ends 92, 94.

The second drive gear 62 comprises similar ramp elements to those described. The ramp elements 88 of each of the drive gears 60, 62 are spaced circumferentially around the annular body of the drive gear 60, 62 on one axial side thereof. The ramp elements 88 of each of the drive gears 60, 62 face axially inwards along the output shaft 18, towards the driven part 72 of the output clutch 64.

Figure 9:
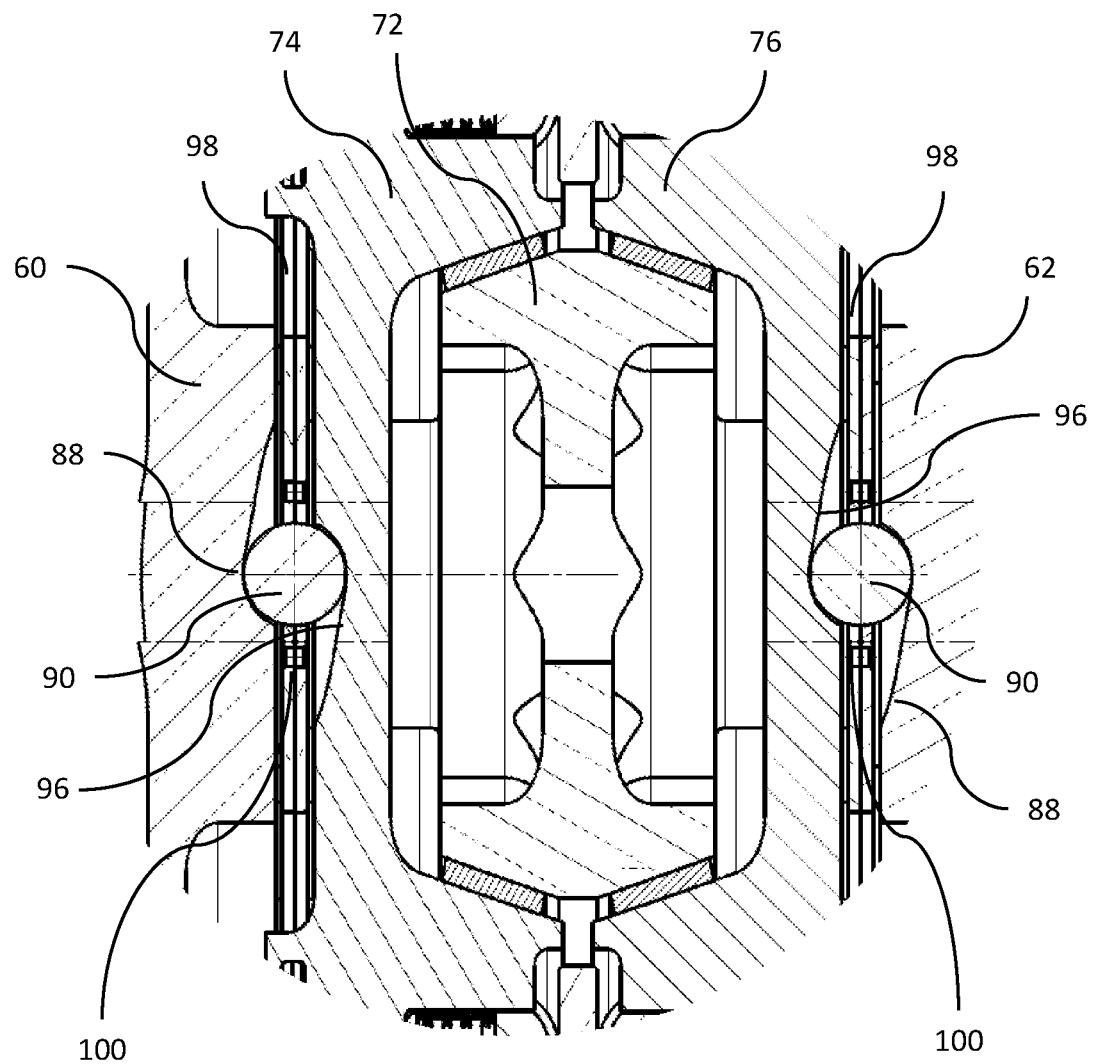
FIG. 9 shows a section front view of the drive system of FIG. 2 along the line B.

FIG. 9 shows a view along line B of FIG. 2, showing the ramp elements and rolling bearings in more detail. In addition to ramp elements 88 formed on the drive gears 60, 62, similar ramp elements 96 are formed on one axial side of each of the driving clutch parts 74, 76 of the output clutch 64. The ramp elements 96 of the driving clutch parts 74, 76 face axially outwards, towards the drive gears 60, 62. The ramp elements 96 of the driving clutch parts 74, 76 comprise all of the same features as the ramp elements 88 of the drive gears 60, 62, but are mirrored to those of the drive gears 60, 62, so that the sloped surfaces extend in an opposite direction circumferentially.

The driver gears 60, 62 and driving clutch parts 74, 76 comprise a corresponding number of ramp elements 88, 96, so that each ramp element 88 on each drive gear 60, 62 has a counterpart ramp element 96 on the driving clutch part 74, 76. A ball bearing 90 is received between each ramp element 88 of the driver gear 74, 76 and the respective counterpart ramp element 96 of the driving clutch part 74, 76.

The ball bearings 90 act to transform a portion of rotational force applied to the drive gear 60, 62 into an axial movement of the driving clutch part 74, 76, into engagement with the driven clutch part 72. When one of the drive gears 60, 62 is driven by one of the overrunning clutches 46*a*-*d* of the input shafts 14, 16, the drive gear 60, 62 initially rotates relative to the driving clutch part 74, 76. The ramp elements 88 of the drive gear 60, 62 force the ball bearing 90 circumferentially along the sloped surfaces of the ramp elements 88, and thereby force the ball bearings 90 in an axial direction towards the driving clutch part 74, 76. The ball bearing 90 bears against the sloped surface of the ramp element 96 on the driving clutch part 74, 76. The driving clutch part 74, 76 is axially moved into engagement with the driven clutch part 72. With the output clutch 64 engaged, the output shaft 18 rotates with the drive gear 60, 62.

Once the input shaft 14, 16 and the drive gear 60, 62 are no longer receiving driving input, the ball bearing 90 is free to return along the sloped surfaces of the ramp elements 88, 96, and the driving clutch part 74, 76 is free to move axially out of engagement with the driven clutch part 72.

In an alternative which is not illustrated, the ramp elements may cooperate with a rolling element other than a ball bearing, such as a cylindrical bearing.

The configuration of the output clutch 64 is such that rotation of either one of the drive gears 60, 62 automatically engages the corresponding driving clutch part 74, 76 with the driven clutch part 72. That is, the driving clutch parts 74, 76 engage selectively based on the received rotational input. This mechanical automation may reduce a complexity of the output clutch 64 as compared to a manual or electronically automated clutch, saving space and weight in the system.

Figure 10:
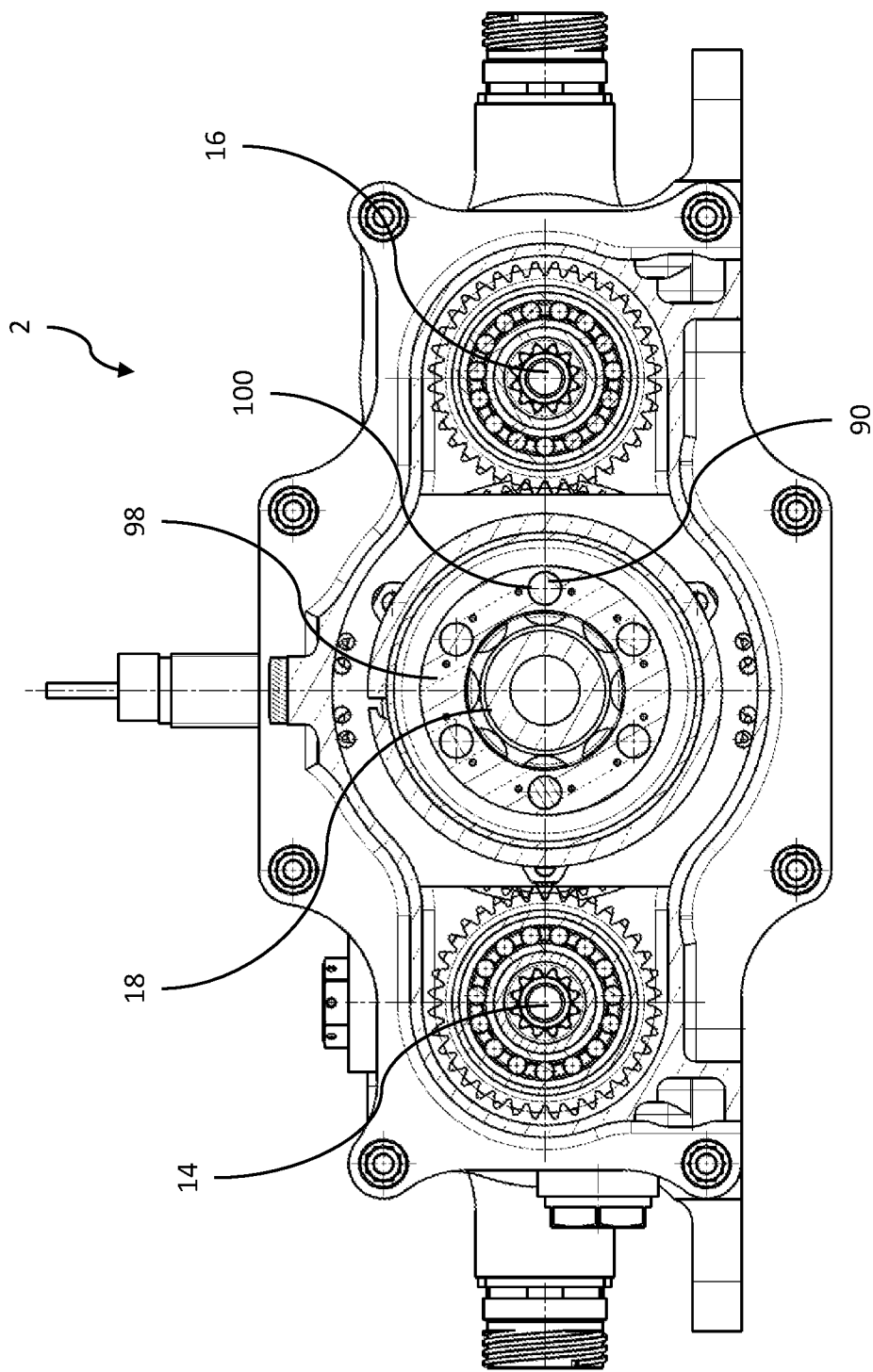
FIG. 10 shows a partial section side view of the drive system of FIG. 9 along the line C.

FIG. 10 shows a section view of the drive system 2 along line C of FIGS. 1 and 3, showing one of a pair of bearing cages 98 which may be positioned around the output shaft 18 to help regulate movement of the ball bearings 90 within the ramp elements 88, 96. First and second bearing cages 98 are provided between each of the first and second drive gears 60, 62 and the adjacent one of driving clutch parts 74, 76. The bearing cages 98 each comprise a disk with an annular body and a central bore defined by a radially inner surface which is spaced from the output shaft 18. A plurality of openings 100 are formed in the body of the disk of the bearing cage 98, extending entirely through the body in the axial direction.

Returning to FIG. 9, the bearing cages 98 are positioned alongside the drive gears 60, 62 and driving clutch parts 74, 76. The openings of the bearing cages 98 are shaped to receive the ball bearings 90 so that the ball bearings 90 sit within the openings 100 and between the cooperating ramp elements 88, 96 of the adjacent drive gear 60, 62 and driving clutch part 74, 76. The bearing cages 98 act to constrain the circumferential position and separation of the ball bearings 90, which in turn regulates the axial movement of all of the ball bearings 90 about the circumference. The cages 98 may thereby provide a more robust and consistent axial actuation of the driving clutch parts 74, 76.

Figure 11:
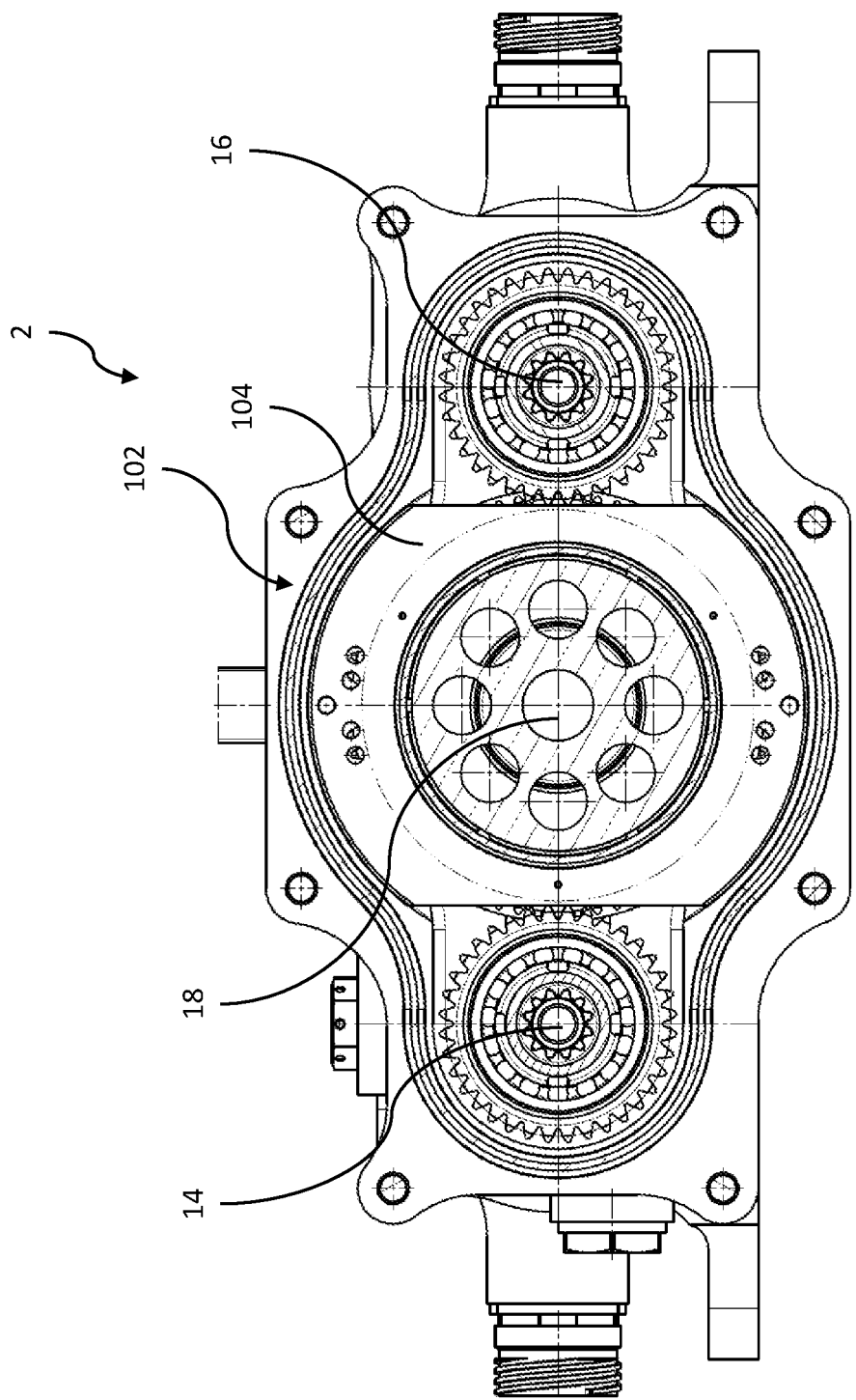
FIG. 11 shows a section front view of the drive system of FIGS. 1 and 3 along the line D.

FIG. 11 shows a section view of the drive system 2 along line D of FIGS. 1 and 3, showing a drag disk arrangement 102 which may function to improve the responsiveness of the driving clutch parts and roller elements to torque input.

Figure 12:
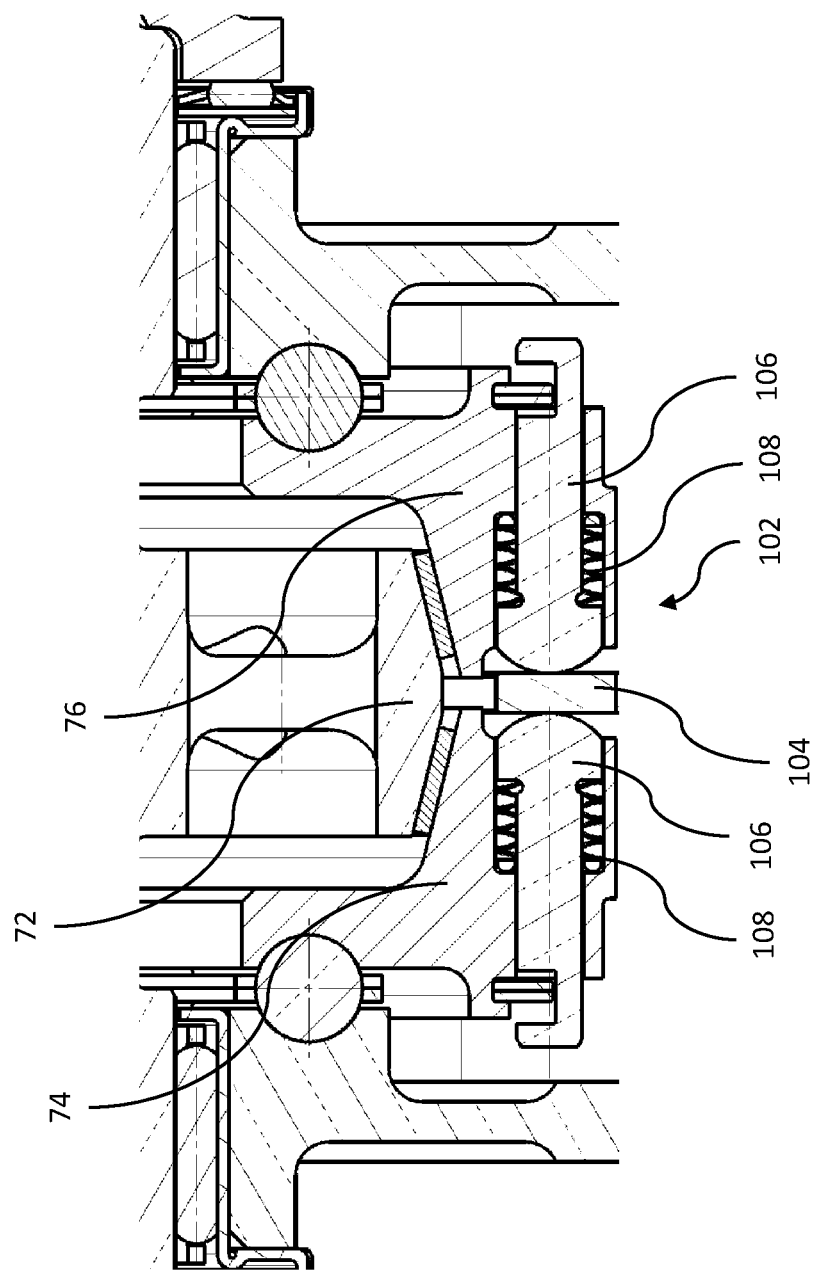
FIG. 12 shows another partial, detail view of another part of the drive system of FIG. 3.

FIG. 12 shows a partial detail view of FIG. 3, showing features of the drag plate arrangement 102. The drag disk arrangement 102 comprises a static drag plate 104 which is fixedly attached to a static portion of the first gearbox so that the plate is held against rotation, and a pair of drag pins 106, each attached to a respective one of the driving clutch parts 74, 76. The drag pins 106 each comprise a spring 108 which bears the pin axially away from the driving clutch part 74, 76 to which it is attached. The drag pins 106 each bear against one of the axial sides of the drag plate 104 so as to generate a generally constant, relatively low level of drag torque from friction between the drag plate 104 and the drag pins 106. The springs 108 keep the drag pins 106 in contact with the drag plate 104 both when the respective driving clutch part 74, 76 is separated from the driven clutch part 72, and when it is engaged.

The drag plate arrangement 102 generates a constant, low level of torque drag which must be overcome by either driving clutch part 74, 76 when it is initially driven in rotation. The torque drag limits a rotation of the driving clutch part 74, 76 slightly relative to the respective drive gear 60, 62, so that initial rotation of the drive gear 60, 62 will force roller bearings along their ramp elements between the drive gear 60, 62 and the driving clutch part 74, 76, rather than only transferring torque to a free-wheeling driving clutch part 74, 76. The low level of torque drag thereby ensures that the initial rotation of the drive gear 60, 62 causes axial movement and proper engagement of the driving clutch part 74, 76.

While the low level of drag on the driving clutch parts for actuation of the roller bearings may instead be provided by other aspects of the design, the use of a drag disk arrangement may allow a fine-tuning of the level of drag via the drag pins. By properly tuning the low level of drag, good function of the driving clutch parts can be ensured without inducing unnecessary inefficiency.

Figure 13:
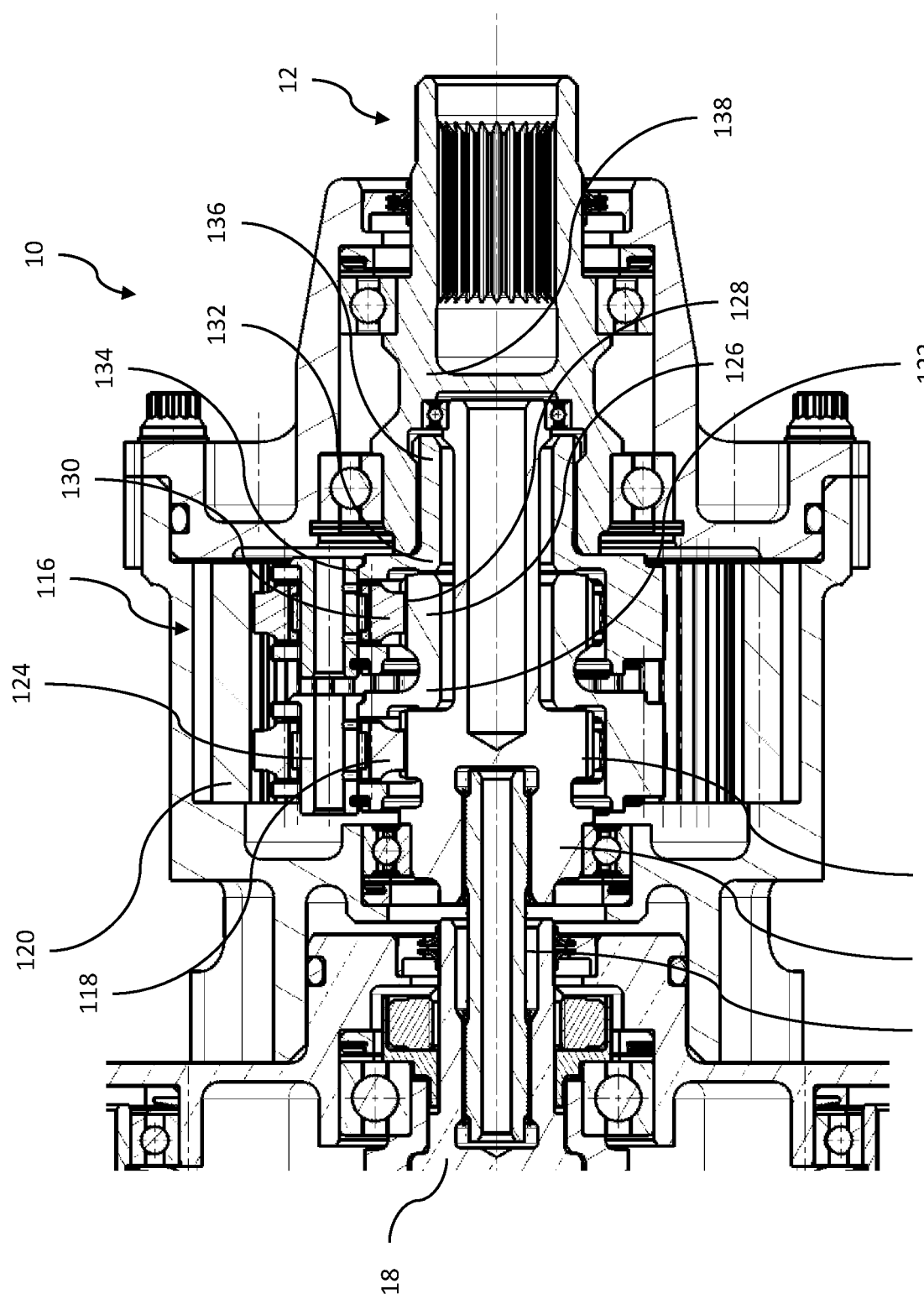
FIG. 13 shows another partial, detail view of another part of the drive system of FIG. 3.

FIG. 13 shows a partial detail view of FIG. 3, showing internal features of the second gearbox 10 in more detail. The second gearbox 10 is configured to provide additional reduction in speed from the output of the first gearbox 8 to a drive system output 12 of the overall drive system 2.

The second gearbox 10 comprises an input shaft 110 for receiving torque from the output shaft 18 of the first gearbox 8. The output shaft 18 and the second gearbox input shaft 110 comprise a connection so as to rotate together. In the example shown, the connection comprises a quill shaft 112 which is received in respective openings formed in axial ends of the output shaft 18 and the input shaft 110. The input shaft 110 comprises gear teeth 114 arranged around an annular periphery.

The second gearbox 10 comprises an elliptical gear system 116 to provide sufficient reduction of speed in a relatively small space. The gear system 116 comprises a first set of planetary gears 118 which are meshed with the gear teeth 116 of the input shaft 110, such that the input shaft 110 acts as a sun gear. The gear system further comprises a ring gear 120 encircling the first set of planetary gears 118 and fixed to an inner periphery of the second gearbox 10. Rotation of the input shaft 110 in a first direction drives rotation of the first set of planetary gears 118 in the same direction within the fixed ring gear 120.

The first set of planetary gears 118 are held by a first gear carrier 122, which comprises pins 124, each pin 124 positioned in one of the first set of planetary gears 118 so that the carrier 120 rotates with the planetary gears 118. The carrier 122 comprises a carrier shaft section 126 extending axially from the pins 124 to provide the rotational output of the first set of planetary gears 118.

In the example shown, the gear system 116 is a two-stage elliptical gear system for providing further reduction of speed in a space-efficient arrangement. The gear system further comprises a second set of planetary gears 130 arranged around the carrier shaft 126 of the first gear carrier 122, axially adjacent to the first set of planetary gears 116. The carrier shaft 126 comprises gear teeth 128 about an outer periphery, which mesh with teeth of the second set of planetary gears 130. The second set of planetary gears 130 rotate within the same ring fixed gear 120 as the first set of planetary gears 118. A second gear carrier 132 comprises pins 134, each pin 134 positioned in one of the second set of planetary gears 130 so that the second gear carrier 132 rotates with the second set of planetary gears 130. The second carrier 132 also comprises a shaft section 136 extending axially from the pins 134 to provide the rotational output.

The second gearbox 10 comprises a second gearbox output shaft 138 which is driven by the output of the gear system. In the example shown, the output shaft 138 comprises a splined connection to the shaft section 136 of the second carrier 132. The output shaft 138 acts as the drive system output 12, providing the output drive of the overall actuator drive system 2.

The first gearbox 8 provides some reduction of speed, such that the output shaft 18 of the first gearbox 8 rotates more slowly than the input shaft or shafts 14, 16, which rotate at the driving speed of the motors 4, 6. The second gearbox 10 provides a greater reduction in speed than the first gearbox 8, to further reduce the overall speed reduction of the system between the motors 4, 6 and the drive system output 12. The second gearbox 10 may have a gear ratio of greater than five times that of the first gearbox 8.

Figure 14:
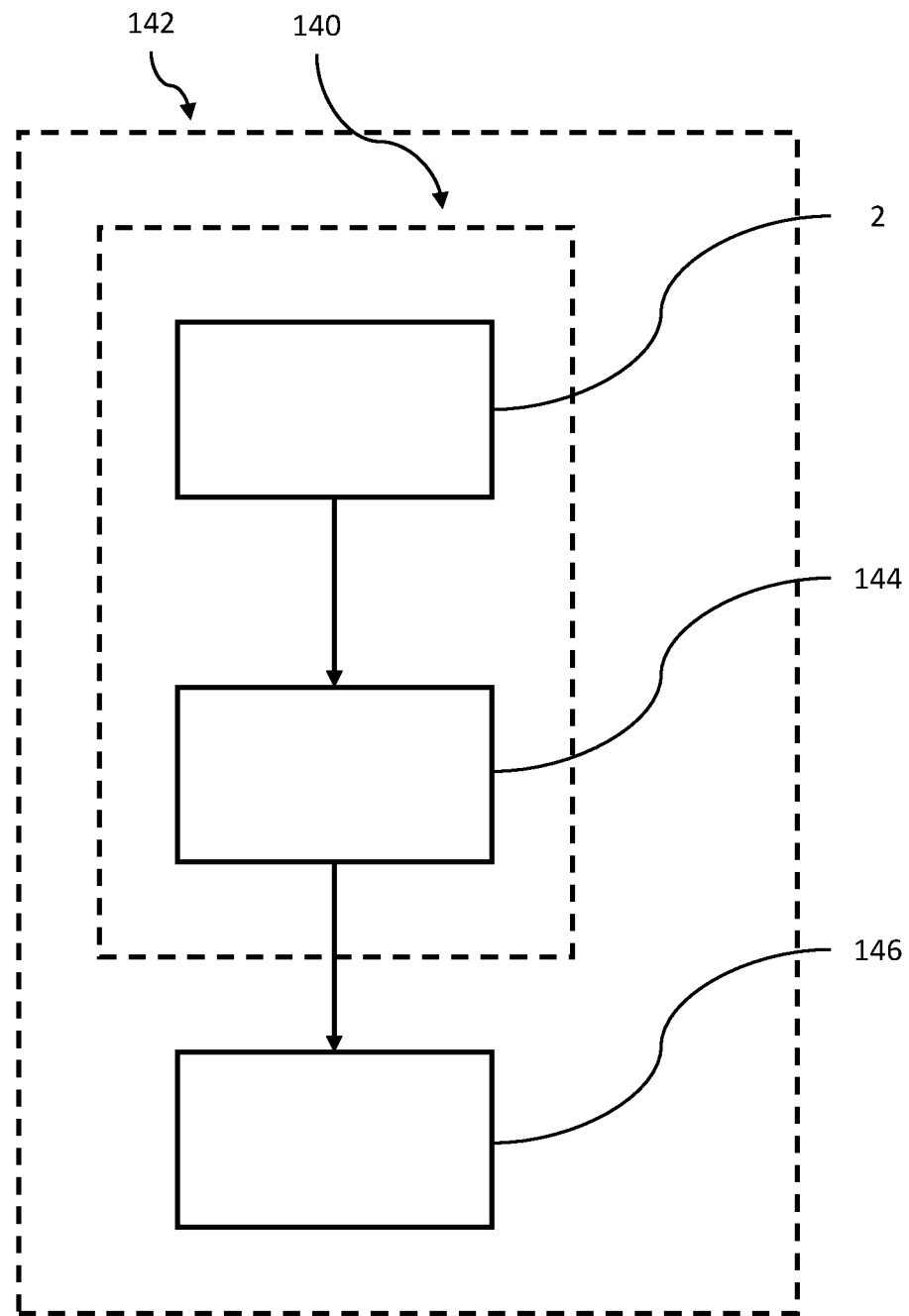
FIG. 14 shows an aircraft control surface assembly.

As shown in FIG. 14, the actuator drive system 2 may form part of an actuator assembly 140, with the drive system 2 arranged to drive an actuator 144 such as a linear actuator. The above-described features of the drive system 2, with two motors configured to provide dual or redundant output in two rotational directions, may be particularly useful in the context of driving such an actuator, which can require robust operation in two actuation directions.

The actuator drive system 2 may further form part of a control surface assembly 142 for an aircraft. In the control surface assembly, the drive system 2 is arranged to drive the actuator 144 and the actuator 144 is arranged to move the control surface 146. The above-described features of the drive system 2 may be particularly useful in the context of driving an aircraft control surface, in which redundant operation is important for safety reasons, space and weight considerations are especially important, and dual-motor operation can be used to provide additional torque in some situations such as mechanical limit cases or emergency operation.

Although certain arrangements are described above by way of example, it will be appreciated that various changes and modifications can be without departing from the scope of the present application.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A drive system for an actuator, the drive system comprising:
   first and second motors;
   first and second input shafts connected to be driven by the respective first and second motors, each of the first and second input shafts comprising:
   a first overrunning clutch configured to rotate with the input shaft in a first direction; and
   a second overrunning clutch configured to rotate with the input shaft in a second direction;
   a first drive gear configured to be driven alternatively by one of the first overrunning clutches, the other of the first overrunning clutches, or both of the first overrunning clutches together;
   a second drive gear configured to be driven alternatively by one of the second overrunning clutches, the other of the second overrunning clutches, or both of the second overrunning clutches together;
an output shaft; and
an output clutch associated with the output shaft, wherein the output clutch and output shaft are arranged to be driven by the first drive gear in a first mode of operation of the drive system and be driven by the second drive gear in a second mode of operation of the drive system;
wherein the output shaft defines an axis of rotation (Z), and the output clutch comprises a driven clutch part connected to the output shaft and first and second driving clutch parts which are axially moveable into and out of engagement with the driven clutch part;
wherein the first and second drive gears are each positioned adjacent to a respective one of the first and second driving clutch parts, each of the first and second drive gears and driving clutch parts comprise a plurality of ramp elements, and a plurality of rolling elements are positioned between the ramp elements of adjacent ones of the first and second drive gears and driving clutch parts.

2. The drive system of claim 1, wherein the plurality of rolling elements (90) comprise a plurality of ball bearings.

3. The drive system of claim 2, further comprising first and second bearing cages, each bearing cage comprising a plurality of openings, the plurality of ball bearings received within the plurality of openings.

4. The drive system of claim 1, further comprising drag disk arrangement comprising a drag plate which is fixed against rotation and at least one drag pin connected to one of the first and second driving clutch parts and in contact with the drag plate.

5. The drive system of claim 1, wherein the output clutch comprises a cone clutch, the driven clutch part comprising a pair of male cone elements and each driving clutch part comprising a pair of female cone elements, one of the male cone elements in frictional contact with one of the pair of female cone elements in the first mode of operation, and the other one of the male cone elements in frictional contact with the other one of the pair of female cone elements in the second mode of operation.

6. The drive system of claim 1, wherein the output clutch comprises a cone clutch, each driving clutch part comprising a pair of male cone elements and each driven clutch part comprising a pair of female cone elements.

7. The drive system of claim 1, wherein each of the first overrunning clutches and each of the second overrunning clutches comprises a sprag clutch, each having a plurality of sprag elements in contact with the respective input shaft.

8. The drive system of claim 1, further comprising an epicyclic gearbox, the output shaft arranged to drive an input of the epicyclic gearbox.

9. The drive system of claim 1, wherein the first and second motors comprise the same maximum speed and torque capability and/or the same relationship of speed to torque.

10. An actuator assembly for a control surface of an aircraft, the actuator assembly comprising:
an actuator; and
the drive system of claim 1, the drive system connected to drive the actuator.

* * * * *